(12) United States Patent
Lee et al.

(10) Patent No.: US 11,379,458 B2
(45) Date of Patent: Jul. 5, 2022

(54) ELECTRONIC DEVICE AND DATA MANAGEMENT METHOD THEREOF

(71) Applicant: Samsung Electronics Co., Ltd., Gyeonggi-do (KR)

(72) Inventors: Kisung Lee, Gyeonggi-do (KR); Hyeeun Jun, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 113 days.

(21) Appl. No.: 16/640,475

(22) PCT Filed: May 28, 2018

(86) PCT No.: PCT/KR2018/006006
§ 371 (c)(1),
(2) Date: Feb. 20, 2020

(87) PCT Pub. No.: WO2019/039706
PCT Pub. Date: Feb. 28, 2019

(65) Prior Publication Data
US 2020/0218710 A1     Jul. 9, 2020

(30) Foreign Application Priority Data

Aug. 23, 2017     (KR) .................. 10-2017-0106959

(51) Int. Cl.
*G06F 16/23*     (2019.01)
*G06F 16/182*     (2019.01)
(Continued)

(52) U.S. Cl.
CPC .......... *G06F 16/2358* (2019.01); *G06F 7/588* (2013.01); *G06F 16/1734* (2019.01);
(Continued)

(58) Field of Classification Search
None
See application file for complete search history.

(56) References Cited

U.S. PATENT DOCUMENTS 6,779,045 B2 *  8/2004  Kendall ................ G06F 3/0613
                                                    710/52
7,062,773 B1     6/2006  Siksa et al.
(Continued)

FOREIGN PATENT DOCUMENTS

CN     104657500 A     5/2015
CN     104809178 A     7/2015
(Continued)

OTHER PUBLICATIONS

Notification of a Decision to Grant a Patent dated Feb. 28, 2022.

*Primary Examiner* — Kim T Nguyen
(74) *Attorney, Agent, or Firm* — Cha & Reiter, LLC

(57) ABSTRACT

An electronic device according to various embodiments of the present invention comprises: a memory for storing a database and a file which includes at least one change data for changing the database; and a processor electrically connected to the memory, wherein, when terminating the use of the database, the processor can initialize at least one data other than a first validity data, included in a header of the file, for determining the validity of the at least one change data, and, when commencing the use of the database following the termination of the use of the database, the processor can change the first validity data included in the header of the file. Other various embodiments are possible.

13 Claims, 15 Drawing Sheets

(51) Int. Cl.
  *G06F 16/18* (2019.01)
  *G06F 16/17* (2019.01)
  *G06F 7/58* (2006.01)

(52) U.S. Cl.
  CPC ...... *G06F 16/1824* (2019.01); *G06F 16/1865* (2019.01); *G06F 16/2365* (2019.01)

(56) References Cited

U.S. PATENT DOCUMENTS

| | | | |
|---|---|---|---|
| 7,310,520 B2 * | 12/2007 | Kim | G06F 21/10 455/418 |
| 7,680,837 B2 * | 3/2010 | Yamato | G06F 12/0246 707/672 |
| 7,689,607 B2 | 3/2010 | Oks et al. | |
| 8,688,648 B2 * | 4/2014 | Andersen | G06Q 50/18 707/690 |
| 8,700,670 B2 | 4/2014 | Marathe et al. | |
| 9,354,864 B2 * | 5/2016 | Kamrowski | G06F 8/658 |
| 9,842,031 B1 | 12/2017 | Kharatishvili | |
| 2002/0138676 A1 * | 9/2002 | Kendall | G11C 7/22 710/74 |
| 2004/0157639 A1 | 8/2004 | Morris et al. | |
| 2014/0089653 A1 | 3/2014 | Jang et al. | |
| 2014/0156618 A1 | 6/2014 | Castellano | |
| 2015/0286671 A1 | 10/2015 | Ebiyama | |
| 2016/0092124 A1 | 3/2016 | Cowling et al. | |
| 2016/0321144 A1 | 11/2016 | Zankl et al. | |
| 2016/0359859 A1 | 12/2016 | Capone | |
| 2017/0371916 A1 | 12/2017 | Shimamura et al. | |
| 2019/0361848 A1 | 11/2019 | Weaver et al. | |
| 2020/0218710 A1 * | 7/2020 | Lee | G06F 7/588 |

FOREIGN PATENT DOCUMENTS

| | | |
|---|---|---|
| CN | 106708427 A | 5/2017 |
| JP | 2015-526832 A | 9/2015 |
| JP | 2018-5299 A | 1/2018 |
| KR | 10-2000-0011602 A | 2/2000 |
| KR | 10-2007-0080354 A | 8/2007 |
| KR | 10-2014-0039611 A | 4/2014 |
| WO | 2015155997 A1 | 10/2015 |
| WO | 2018-170276 A2 | 9/2018 |

* cited by examiner

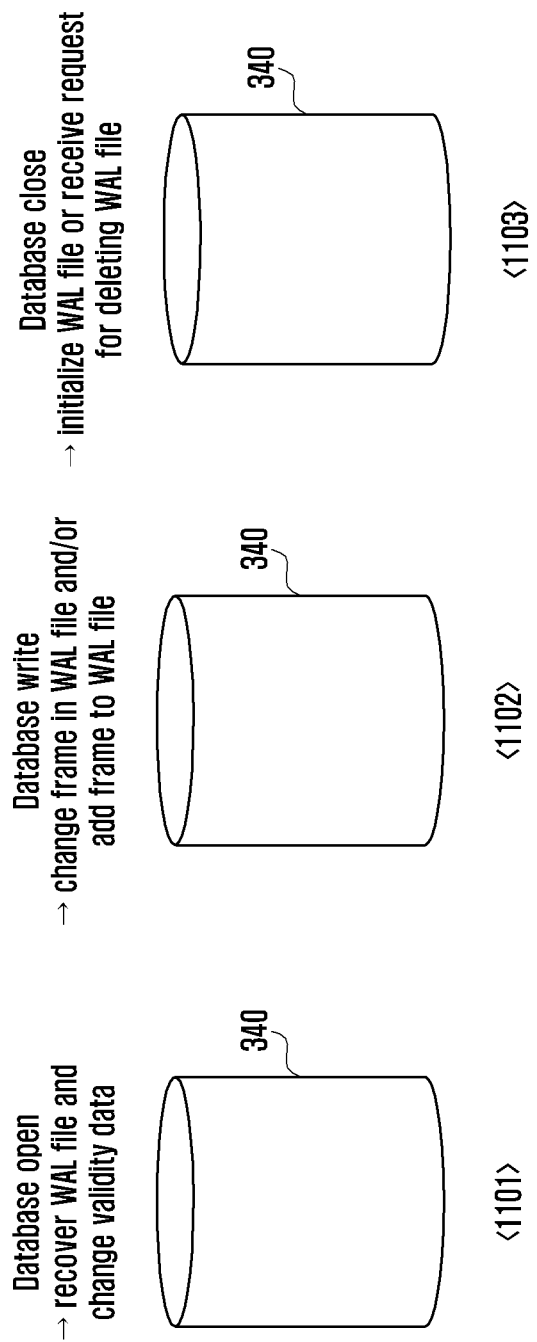

ELECTRONIC DEVICE AND DATA MANAGEMENT METHOD THEREOF

CROSS REFERENCE TO RELATED APPLICATIONS

This application is a National Phase Entry of PCT International Application No. PCT/KR2018/006006, which was filed on May 28, 2018, and claims a priority to Korean Patent Application No. 10-2017-0106959, which was filed on Aug. 23, 2017, the contents of which are incorporated herein by reference.

TECHNICAL FIELD

Various embodiments of the disclosure relate to an electronic device and a data management method therefor.

BACKGROUND ART

With recent advances in technology, various electronic devices, such as personal digital assistants (PDA), electronic organizers, smartphones, and tablet personal computers, have been popularized and applications that can provide various functions to users are being developed.

Recently, various techniques for managing and utilizing data related to applications executing on electronic devices are being developed. For example, database management systems have been developed to enable electronic devices to configure databases (DB) including various data related to applications as one or more files. Meanwhile, in order for an application to run properly on an electronic device, there is a need to ensure data integrity for protecting the data contained in the database and maintaining valid data in the database at all times, and there is also a need to guarantee the atomicity of transactions on the database. Here, atomicity means that the results of all operations related to one transaction are either fully reflected in the database or not reflected at all.

DISCLOSURE OF INVENTION

Technical Problem

Database management systems can use a variety of schemes to ensure the atomicity of transactions on the database. For example, a database management system called SQLite can guarantee the atomicity of transactions by using write-ahead logging (WAL) among various schemes. In WAL, before writing data to the database or deleting or changing data stored in the database according to a transaction, a separate file is created and the results of transaction processing are stored in the separate file first. Then, if a specific condition is satisfied, the transaction processing results stored in the separate file is reflected in the database by storing data in the database, or deleting or changing data stored in the database. Here, the separate file that stores the results of processing related to the transaction may be referred to as a WAL file. When WAL is used, even if an error occurs in the middle of storing the results of transaction processing in the WAL file, the database can still maintain valid data, ensuring data integrity. In this case, the operation of reflecting the processing result stored in the WAL file in the database may be referred to as a checkpoint.

Meanwhile, in a general WAL scheme, when the use of the database is ended, the WAL file can be deleted or the size of the WAL file can be truncated to zero. In this case, the metadata of the file system may be changed, and the region where the WAL file is deleted from the data area of the file system may be cleaned up. However, repeated changes to the file system's metadata and repeated cleanup of the region where a WAL file is deleted can result in fragmentation of the file system. This can also result in a large number of disk input and output operations on the storage device, reducing the life time of the storage device.

Solution to Problem

According to various embodiments of the disclosure, there is provided an electronic device. The electronic device may include: a memory to store a database and a file containing at least one piece of change data for changing the database; and a processor electrically connected to the memory, wherein the processor may be configured to: initialize at least one piece of data contained in the header of the file except for first validity data for determining the validity of the change data when the use of the database is terminated; and change the first validity data contained in the header of the file when the use of the database is started after the use of the database has been ended.

According to various embodiments of the disclosure, there is provided a method of data management for an electronic device. The method may include: initializing, when the use of a database is terminated, at least one piece of data contained in the header of a file, which contains at least one piece of change data for changing the database, except for first validity data for determining the validity of the change data; and changing the first validity data contained in the header of the file when the use of the database is started after the use of the database has been ended.

Advantageous Effects of Invention

According to various embodiments of the disclosure, when the use of the database is ended, at least a portion of the WAL file header is initialized without deleting the WAL file or truncating the size of the WAL file to zero. Hence, it is possible to reuse the WAL file, and this reuse may prevent fragmentation of the file system and deterioration of the life time of the storage device.

According to various embodiments of the disclosure, for reusing a WAL file, a frame stored before the header of the WAL file is initialized can be distinguished from a frame stored after the header of the WAL file is initialized. Hence, it is possible to more accurately and rapidly determine the validity of a specific frame stored in the WAL file.

BRIEF DESCRIPTION OF DRAWINGS

FIG. 11A shows an example of operations on the database and WAL file of an electronic device according to various embodiments of the disclosure.

MODE FOR THE INVENTION

Figure 1:
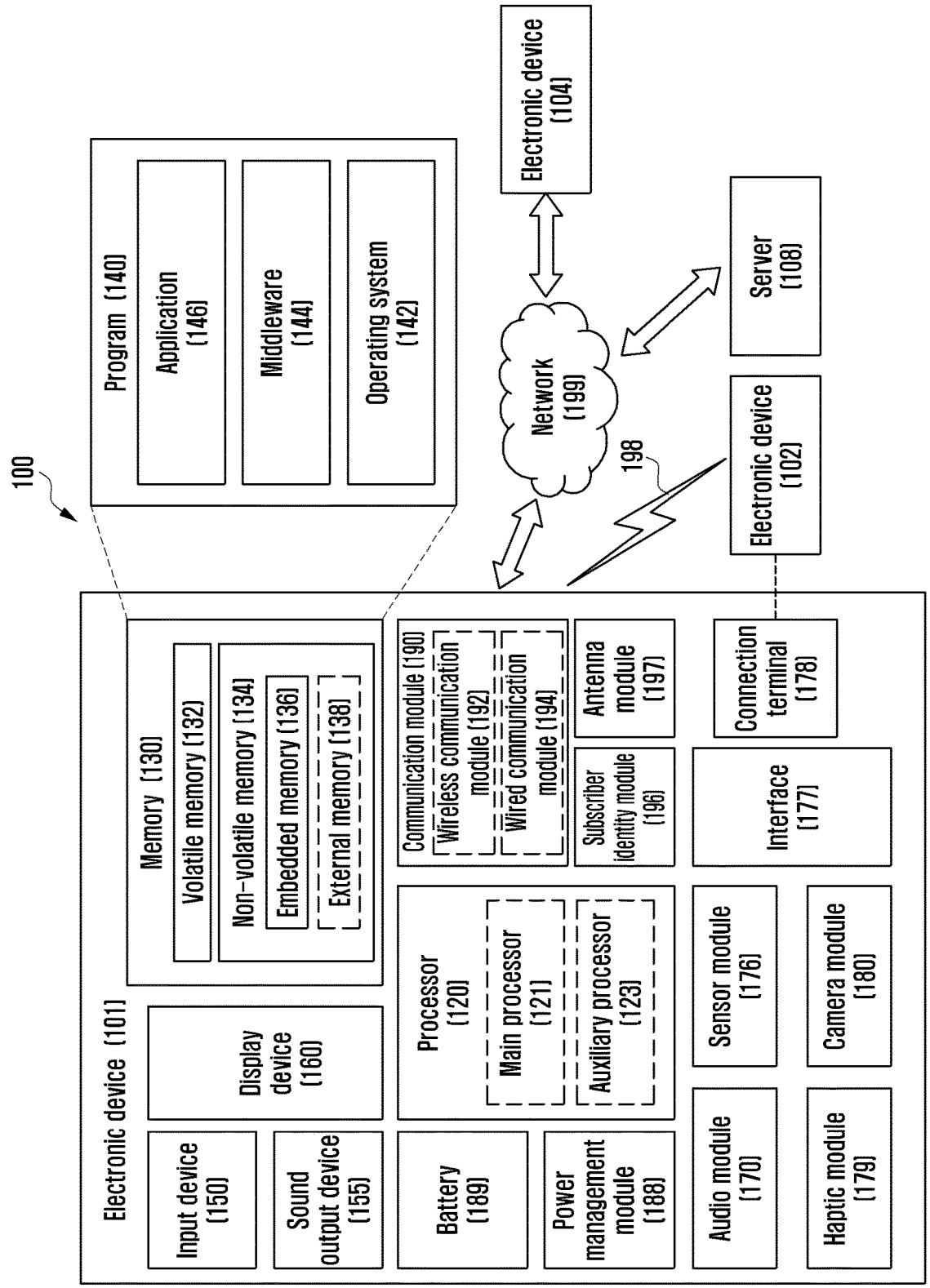
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation.

According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
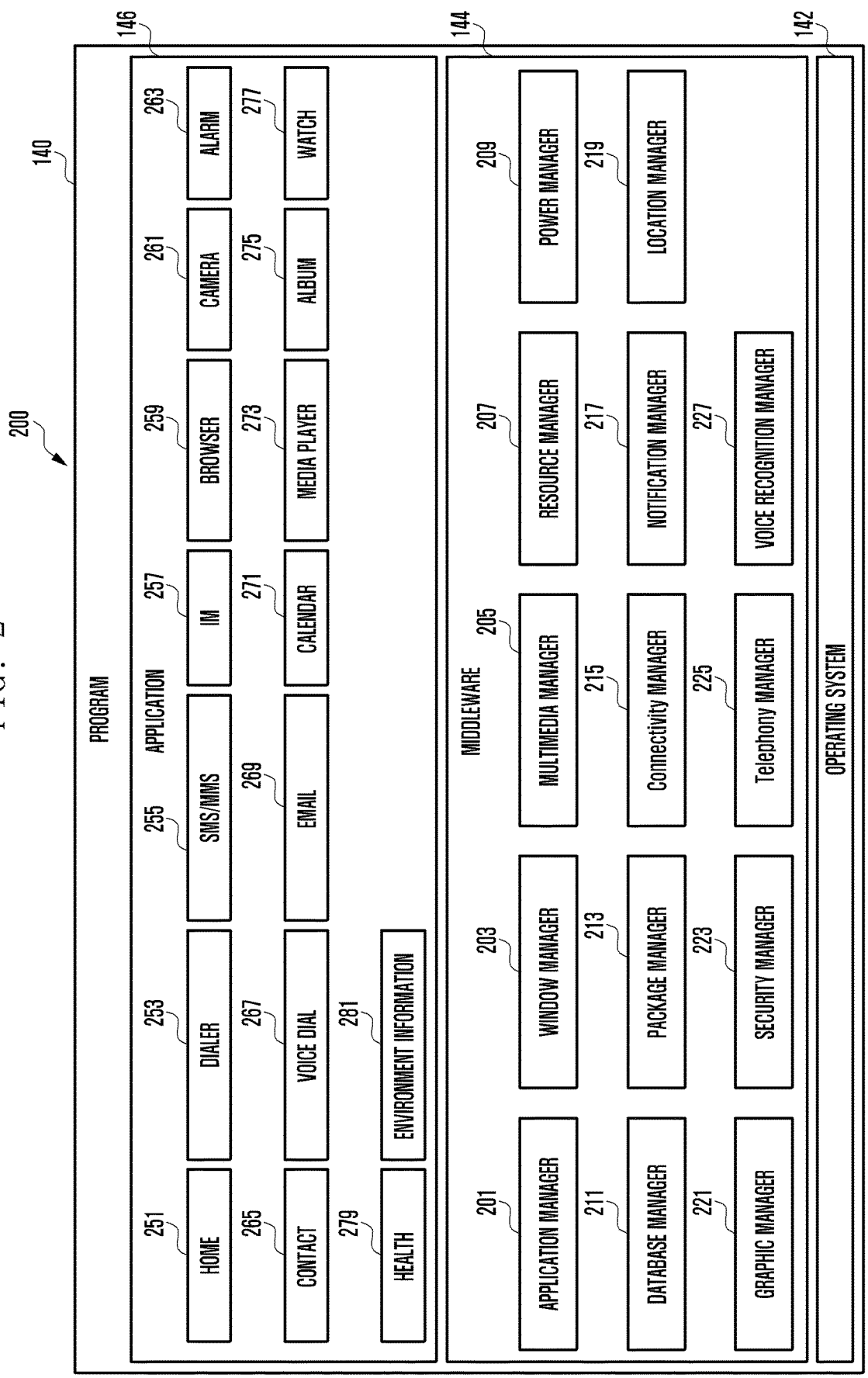
FIG. 2 shows a structure of programs according to various embodiments of the disclosure.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227. The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101. The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects. The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101. The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
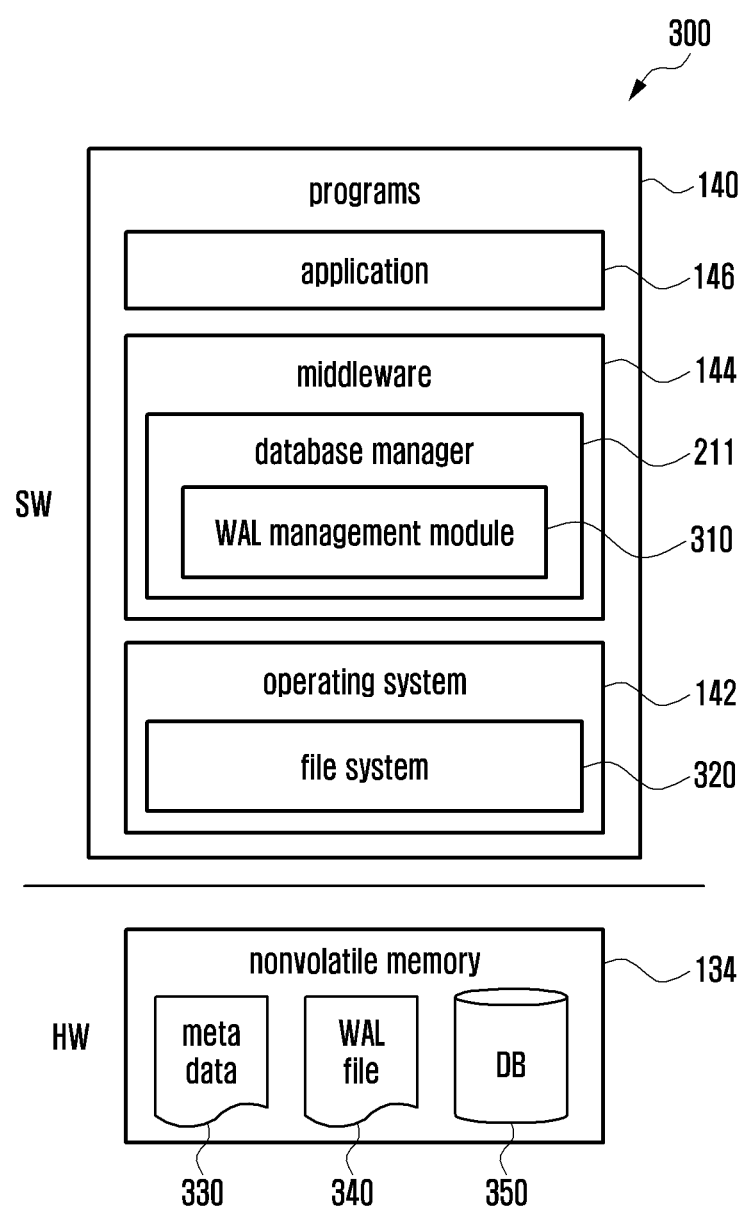
FIG. 3 illustrates a configuration of programs and a nonvolatile memory according to various embodiments of the disclosure.

FIG. 3 is a diagram 300 depicting a configuration of programs 140 and a nonvolatile memory 134 according to various embodiments of the disclosure.

With reference to FIG. 3, the nonvolatile memory 134 may store, for example, a piece of metadata 330, a WAL file 340, and/or a database 350.

The metadata 330 is structured data about the data managed by, for example, the file system 320 and may refer to data describing other data. The metadata 330 may include information regarding the size, name, storage location of other data and may refer to data including information about other data.

The WAL file 340 is a file managed by the database manager 211 and the WAL management module 310, and may mean a file including at least one piece of data for changing the database 350. For example, the WAL file 340 may refer to a file that records a data change log before changing data stored in the database 350. The WAL file 340 may also be referred to as a database journal file, journal data, or the like.

The database 350 is a file managed by the database manager 211 and may mean a file including data related to, for example, the application 146.

In various embodiments, the programs 140 may include an operating system 142, a middleware 144, and/or an application 146.

The operating system 142 may include, for example, a file system 320 capable of managing the memory 130 and data stored in the memory 130.

The database manager 211 of the middleware 144 may include, for example, a WAL management module 310.

The database manager 211 may perform operations for opening the database 350, closing the database 350, and/or writing data to the database 350. The database manager 211 may receive a command or statement from the application 146 through, for example, an application programming interface (API). Here, the API may mean, for example, an interface provided to allow the application 146 to control a function provided by the middleware 144, and may include at least one interface or function (e.g., method) for controlling the database.

The WAL management module 310 may perform an operation related to, for example, the WAL file 340 and/or the database 350. For example, the WAL management module 310 may perform operations such as creating a WAL file 340, deleting the WAL file 340, initializing the WAL file 340, changing values of the elements included in the WAL file 340, writing data about processing results corresponding to the transaction to the WAL file 340, opening the database 350, closing the database 350, and/or writing data to the database 350.

When the number of frames in the WAL file 340 reaches a preset number (e.g., 1000), the WAL management module 310 may perform a checkpoint operation. The WAL management module 310 may also perform a checkpoint operation when a checkpoint message is generated by the application 146 associated with the database 350.

Meanwhile, the database manager 211 may include various database management systems, and SQLite may be one of various database management systems.

Figure 4A:
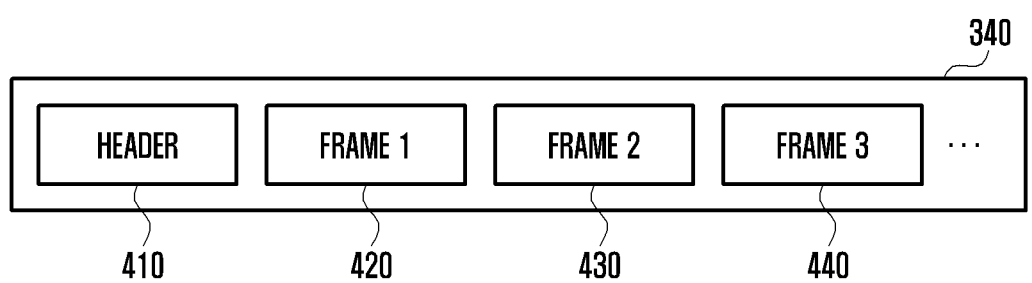
FIG. 4A illustrates the format of a WAL file according to various embodiments of the disclosure.
Figure 4B:
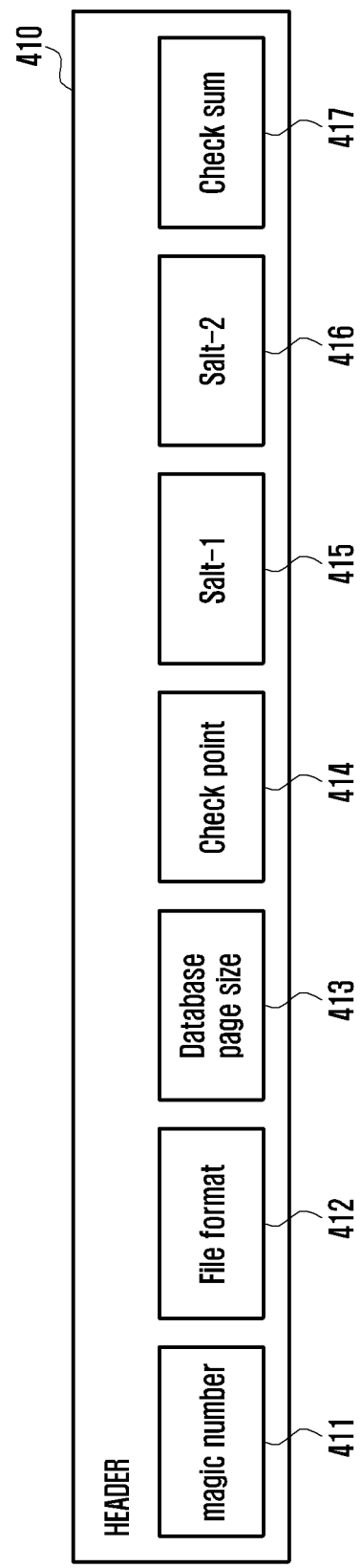
FIG. 4B illustrates the format of a WAL file header according to various embodiments of the disclosure.
Figure 4C:
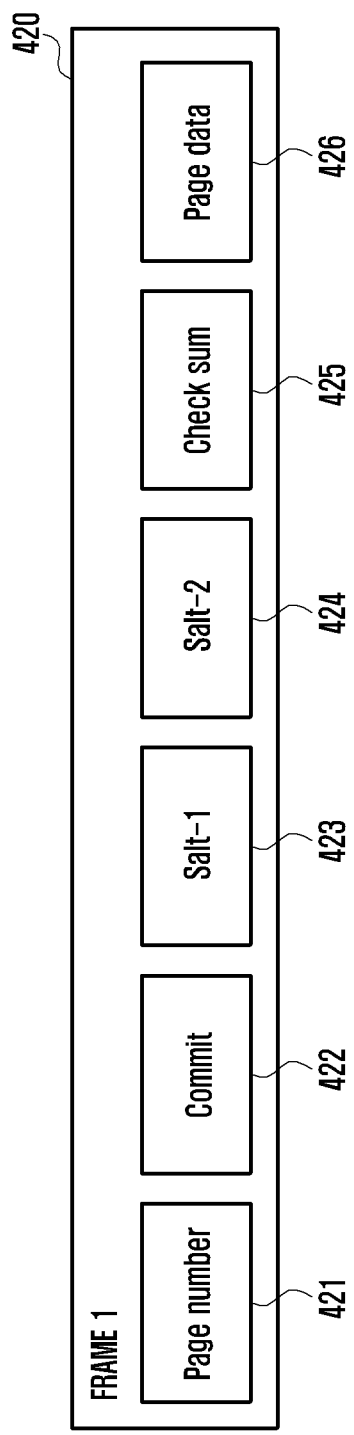
FIG. 4C illustrates the format of a WAL file frame according to various embodiments of the disclosure.

FIG. 4A illustrates the format of a WAL file 340 according to various embodiments of the disclosure. FIG. 4B illustrates the format of the header 410 of the WAL file 340 according to various embodiments of the disclosure. FIG. 4C illustrates the format of the frame of the WAL file 340 according to various embodiments of the disclosure.

With reference to FIG. 4A, the WAL file 340 may include, for example, a header 410 and one or more frames 420, 430 and 440 that contain data for changing the database 350. The frames in the WAL file 340 may be referred to as a first frame 420, a second frame 430, and a third frame 440. In one embodiment, when the database 350 is divided into data sets of a preset size, each data set of the database 350 may be referred to as a page. For management, the electronic device 101 may assign page numbers to individual pages of the database 350. On the other hand, the frame may refer to a configuration element of the WAL file 340 including data for adding a page to the database 350 or changing at least one page of the database 350. The frame may be referred to as change data for changing the database 350.

With reference to FIG. 4B, the header 410 of the WAL file may include fields for, for example, a magic number 411, a file format 412, a database page size 413, a checkpoint 414, Salt-1 (415), Salt-2 (416), and a checksum 417.

The magic number 411 may be a field of the header 410 including a unique value representing the WAL file 340. For example, the magic number 411 may include a hexadecimal value of 0x377f0682 or 0x377f0683 as a unique value representing the WAL file 340.

The file format 412 may be a field of the header 410 including data representing the version of the WAL file 340.

The database page size 413 may be a field of the header 410 including data about the size of a page included in the database 350.

The checkpoint 414 may be a field of the header 410 including data about the number of times the database 350 has been changed based on the WAL file 340 (i.e., the number of checkpoint operations performed) for a period from the beginning of using the database 350 to the end of using the database 350. For example, the electronic device 101 may increase the value of the checkpoint 414 by 1 from 0 each time the database 350 is changed according to the checkpoint operation for a period from the beginning of using the database 350 to the end of using the database 350. In one embodiment, the checkpoint operation may be referred to as a commit operation.

Salt-1 (415) and Salt-2 (416) may be a field of the header 410 including validity data that is a criterion for determining the validity of the frame 420, 430 or 440 of the WAL file 340. Salt-1 (415) and Salt-2 (416) may include different data. The validity data included in Salt-1 (415) and Salt-2 (416) may be changed according to a preset criterion, for example, whenever the checkpoint operation is performed. For example, when the use of the database is started, the electronic device 101 can produce two different random values and set the validity data of Salt-1 (415) and Salt-2 (416) respectively to the two random values. Alternatively, when the use of the database is started, the electronic device 101 may change the validity data of Salt-1 (415) (and/or Salt-2 (416)) by, for example, adding or subtracting 1 to or from the validity data of Salt-1 (415) (and/or Salt-2 (416)). Meanwhile, only one of Salt-1 (415) and Salt-2 (416) may be included as an element in the header 410.

The checksum 417 may be a field of the header 410 including data for checking whether the header 410 is in error. For example, the checksum 417 may include the result of applying an operation to the values of the fields of the header 410 except for the checksum 417 according to a preset criterion, or may include the result of summing the values of the fields of the header 410 except for the checksum 417.

With reference to FIG. 4C, the first frame 420 may include fields for, for example, a page number 421, a commit 412, Salt-1 (423), Salt-2 (424), a checksum 425, and page data 426. Here, the page number 421, the commit 412, Salt-1 (423), Salt-2 (424), and the checksum 425 of the first frame 420 except for the page data 426 may constitute the header of the first frame 420. Meanwhile, each frame included in the WAL file 340 may be composed of all or some of the fields of the first frame 420.

The page number 421 may be a field of the first frame 420 including data about the page number of a page of the database 350 changed based on the first frame 420.

The commit 422 may be a field of the first frame 420 including data indicating whether all the processing results of a transaction for changing the page of the database 350 corresponding to the first frame 420 are stored in the first frame 420. For example, if all the processing results of a transaction for changing the page of the database 350 corresponding to the first frame 420 are stored in the first frame 420, the electronic device 101 may include a value corresponding to the size of the page of the database 350 in the commit 412. If some or none of the processing results of a transaction for changing the page of the database 350 corresponding to the first frame 420 are stored in the first frame 420, the electronic device 101 may include a value of 0 in the commit 412.

Salt-1 (423) and Salt-2 (424) may be a field of the first frame 420 including validity data that is a criterion for determining the validity of the first frame 420, and Salt-1 (423) and Salt-2 (424) may correspond respectively to Salt-1 (415) and Salt-2 (416) of the header 410. Salt-1 (423) and Salt-2 (424) may inherit data values included in Salt-1 (415) and Salt-2 (416) of the header 410, respectively, for example, when the first frame 420 is added to the WAL file 340. Meanwhile, only one of Salt-1 (423) and Salt-2 (424) may be included in the first frame 420.

The checksum 425 may be a field of the first frame 420 including data for checking whether the first frame 420 is in error. For example, the checksum 425 may include the result of applying an operation to the values of the fields of the header of the first frame 420 except for the WAL file header 410 and the checksum 425 according to a preset criterion, or may include the result of summing the values of the fields of the header of the first frame 420 except for the WAL file header 410 and the checksum 425. On the other hand, the checksum of the second frame 430 in the WAL file 340 may include the result of applying an operation to the values of the fields of the header of the second frame 430 except for the WAL file header 410, each field of the first frame 420, and the checksum of the second frame 430 according to a preset criterion.

The page data 426 may be a field of the first frame 420 including data for changing a page of the database 350. Here, the size of the page data 426 may be the same as the page size of the database 350. For example, the electronic device 101 may include the processing result of a transaction in the page data 426 as data for changing the corresponding page of the database 350.

Figure 5:
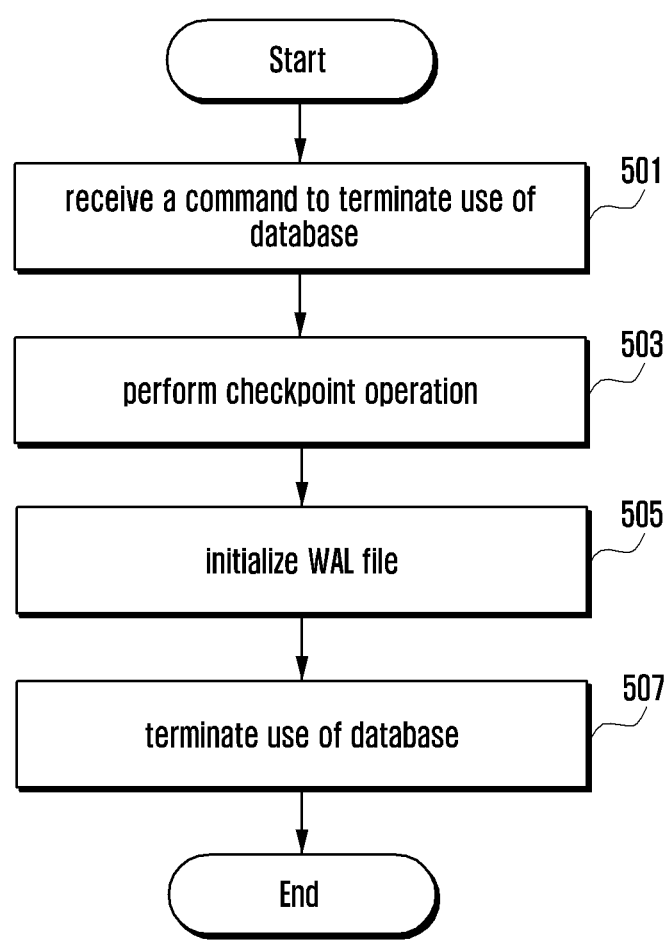
FIG. 5 is a flowchart of a data management method for an electronic device according to various embodiments of the disclosure.

FIG. 5 is a flowchart of a data management method for the electronic device 101 according to various embodiments of the disclosure.

With reference to FIG. 5, at operation 501, the electronic device 101 (e.g., processor 120) may receive a command for terminating the use of the database 350. Specifically, when receiving a user input for terminating a function related to the application 146 (e.g., data entry, change or deletion), the electronic device 101 may recognize this user input as a command for terminating the use of the database 350. For example, when the user completes addition of a contact by using the contact application 265, the electronic device 101 may determine that a command for terminating the use of the database 350 is received. Meanwhile, when the electronic device 101 receives a command to terminate the use of the database 350, the database manager 211 (and/or the WAL management module 310) of the electronic device 101 may receive a command to close the database 350 through an API from the application 144.

In various embodiments, at operation 503, the electronic device 101 may perform a checkpoint operation. At this time, the electronic device 101 may determine the validity of the frames in the WAL file 340 and change the database based on the frame determined to be valid. Specifically, the electronic device 101 may compare the data values of Salt-1 (315) and/or Salt-2 (316) of the header 310 of the WAL file 340 with the data values of Salt-1 (323) and/or Salt-2 (324) of the frame 320 of the WAL file 340, respectively, and may determine the validity of the frame 320 based on the comparison result. For example, if the data values of Salt-1 (315) and/or Salt-2 (316) are identical respectively to the data values of Salt-1 (323) and/or Salt-2 (324), the electronic device 101 may determine that the frame 320 is valid and change the database based on the page data 326 included in the frame 320. On the other hand, if the data values of Salt-1 (315) and Salt-2 (316) are not identical respectively to the data values of Salt-1 (323) and Salt-2 (324), the electronic device 101 may determine that the frame 320 is not valid. If there is no valid frame, the electronic device 101 may skip the checkpoint operation.

In various embodiments, after operation 503, the electronic device 101 (e.g., database manager 211 and/or WAL management module 310) may determine whether the WAL file retention policy is applied (not shown). If the WAL file retention policy is applied, the procedure may proceed to operation 505. If the WAL file retention policy is not applied, the electronic device may delete the WAL file and the procedure may proceed to operation 507.

In various embodiments, at operation 505, the electronic device 101 may initialize the WAL file 340. Specifically, the electronic device 101 may initialize (invalidate) the WAL file 340 by changing the data value of at least one field of the header 410 of the WAL file 340 to a preset value. For example, the electronic device 101 may initialize the WAL file 340 by changing the data value of the magic number 411 of the header 410 to a value of 0x00000000. As another example, the electronic device 101 may also initialize the WAL file 340 by changing the data value of a remaining field except for at least one of Salt-1 (415) and Salt-2 (416) among the fields of the header 410.

Meanwhile, upon receiving a command to terminate the use of the database 350, the electronic device 101 may delete some of the frames included in the WAL file 340. For example, if the size of the WAL file 340 is 4 MBytes, the electronic device 101 may delete some of the frames included in the WAL file 340 so that the size of the WAL file 340 becomes 2 MBytes.

In various embodiments, at operation 507, the electronic device 101 may terminate the use of the database 350. For example, the WAL management module 310 of the electronic device 101 may close the database 350, which is a file stored in the nonvolatile memory 134.

According to various embodiments of the disclosure, even when the use of the database is terminated, the WAL file 340 can be reused by initializing the header 410 of the WAL file 340 without deleting the WAL file 340 or changing the size of the WAL file 340 to zero. This may reduce the frequency of changing the metadata 330 of the file system 320 or cleaning up the region where the WAL file 340 is deleted, thereby preventing fragmentation of the system and deterioration of the life time of the storage device. In various embodiments, the electronic device 101 may determine whether to delete the WAL file 340 or initialize the WAL file 340 for reuse according to user settings.

Figure 6:
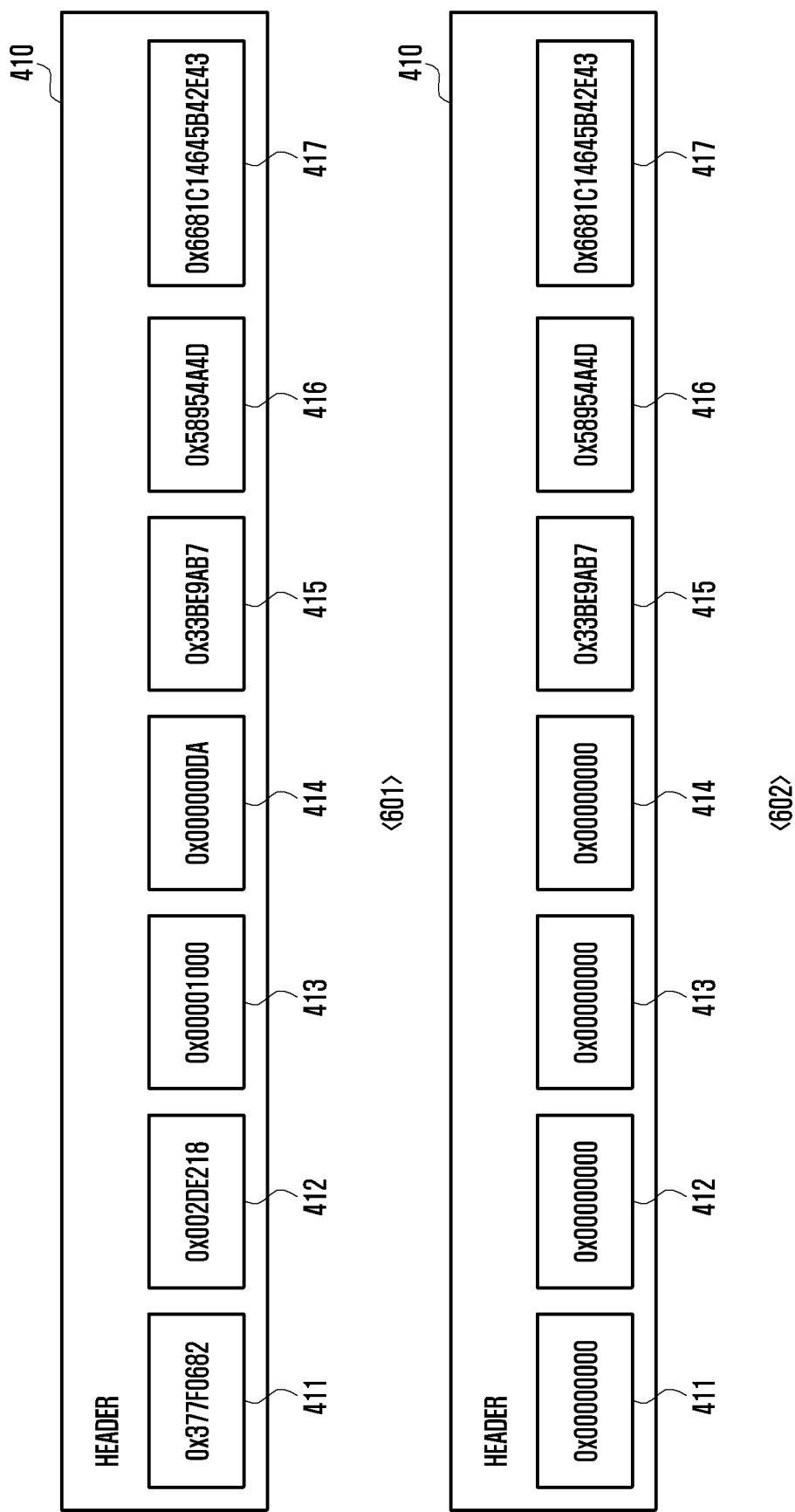
FIG. 6 shows an example of a WAL file header initialized in accordance with the data management method for an electronic device according to various embodiments of the disclosure.

FIG. 6 shows an example of the header 410 of a WAL file 340 initialized in accordance with the data management method for the electronic device 101 according to various embodiments of the disclosure.

As indicated by indicia 601 in FIG. 6, it can be seen that different data values are stored in the fields of the header 410 before initialization.

As indicated by indicia 601 in FIG. 6, after initialization of the header 410, the data values of the magic number 411, the file type 412, the page size 413, and the checkpoint 414 of the header 410 are changed to 0x00000000. This may confirm that the header 410 of the WAL file 340 is normally initialized.

Figure 7:
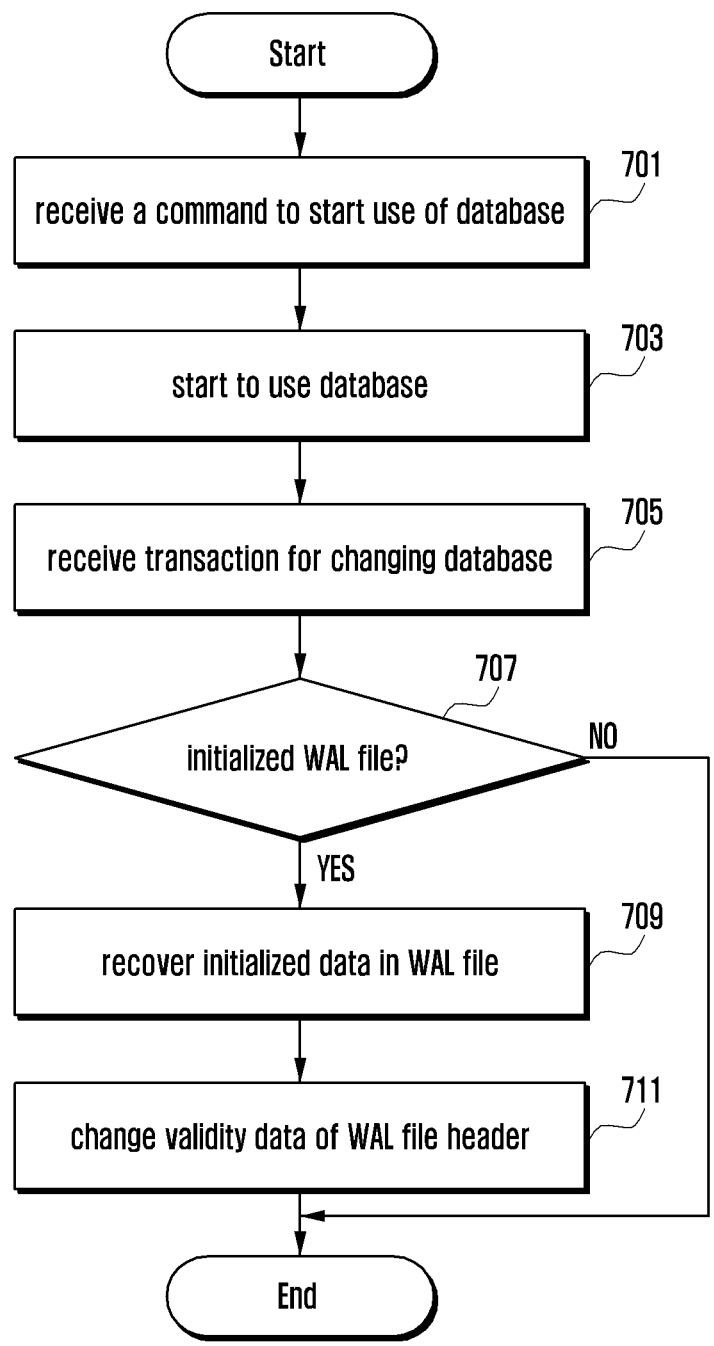
FIG. 7 is a flowchart of a data management method for an electronic device according to various embodiments of the disclosure.

FIG. 7 is a flowchart of a data management method for the electronic device 101 according to various embodiments of the disclosure. A detailed description of contents overlapping with those described in FIG. 5 will be omitted.

With reference to FIG. 7, at operation 701, the electronic device 101 may receive a command for starting the use of the database 350 (e.g., database open command). For example, when receiving a user input for executing a function related to the application 146 (e.g., data entry, change or deletion), the electronic device 101 may determine that a command for starting the use of the database 350 is received. As another example, when the user executes a function of displaying a contact list by using the contact application 265, the electronic device 101 may determine that a command for starting the use of the database 350 is received. Meanwhile, when the electronic device 101 receives a command to start the use of the database 350, the database manager 211 and/or the WAL management module 310 of the electronic device 101 may receive a command to open the database 350 through an API from the application 144.

In various embodiments, at operation 703, the electronic device 101 may start to use the database 350. For example, the database manager 211 and/or the WAL management module 310 of the electronic device 101 may open the database 350, which is a file stored in the nonvolatile memory 134.

In various embodiments, at operation 705, the electronic device 101 may receive a transaction command. For example, the electronic device 101 may receive a transaction command for writing, changing, and/or deleting data in relation to the application 144. Meanwhile, the database manager 211 and/or the WAL management module 310 of the electronic device 101 may receive a transaction command for changing data of the database 350 (e.g., insert, delete, or update) through an API from the application 144.

In various embodiments, at operation 707, the electronic device 101 may determine whether the WAL file 340 is an initialized file. For example, if the data value of at least one field of the header 410 including the magic number 411 is 0x00000000, the electronic device 101 may determine that the WAL file 340 is initialized. If the data value of at least one field of the header 410 including the magic number 411 is not 0x00000000, the electronic device 101 may determine that the WAL file 340 is not initialized. For ease of description, 0x00000000 has been described as an initialization value. However, the disclosure is not limited thereto, and another value may be used as an initialization value.

In various embodiments, if the WAL file 340 is an initialized file, at operation 709, the electronic device 101 may recover the initialized data among data included in the WAL file 340. For example, the electronic device 101 may recover original data of the initialized field among the fields of the header 410 of the WAL file 340. For example, if the data value of the magic number 411 of the header 410 is 0x00000000, the electronic device 101 may change the data value of the magic number 411 to the original value before initialization.

In various embodiments, at operation 711, the electronic device 101 may change validity data included in the header 410 of the WAL file 340. For example, the electronic device 101 may change validity data of Salt-1 (415) (and/or Salt-2 (416)) by adding or subtracting 1 to or from the validity data value of Salt-1 (415) (and/or Salt-2 (416)). Alternatively, the electronic device 101 may produce a random value different from the validity data value of Salt-1 (415) (and/or Salt-2 (416)) of the header 410 and change the validity data value of Salt-1 (415) (and/or Salt-2 (416)) to the produced random value.

In FIG. 7, the electronic device 101 has been described as performing a sequence of operations including receiving a command to start the use of the database 350 at operation 701, starting the use of the database 350 at operation 703, receiving a transaction command (e.g., insert, delete, or update) for changing the database first, and performing operations 707 to 711. However, the disclosure is not limited thereto. In various embodiments, if the electronic device 101 receives a command to start the use of the database 350 at operation 701, even when there is no reception of a transaction command (e.g., insert, delete, or update) for changing the database, the electronic device 101 may perform operations 707 to 711.

According to various embodiments of the disclosure, even when a function for changing the database is ended, the header 410 of the WAL file 340 is initialized without deleting the WAL file 340 or truncating the size of the WAL file 340 to zero. Hence, it is possible to reuse the WAL file 340. This may reduce the frequency of changing the metadata 330 of the file system 320 or cleaning up the region where the WAL file 340 is deleted, thereby preventing fragmentation of the system and deterioration of the life time of the storage device.

Figure 8:
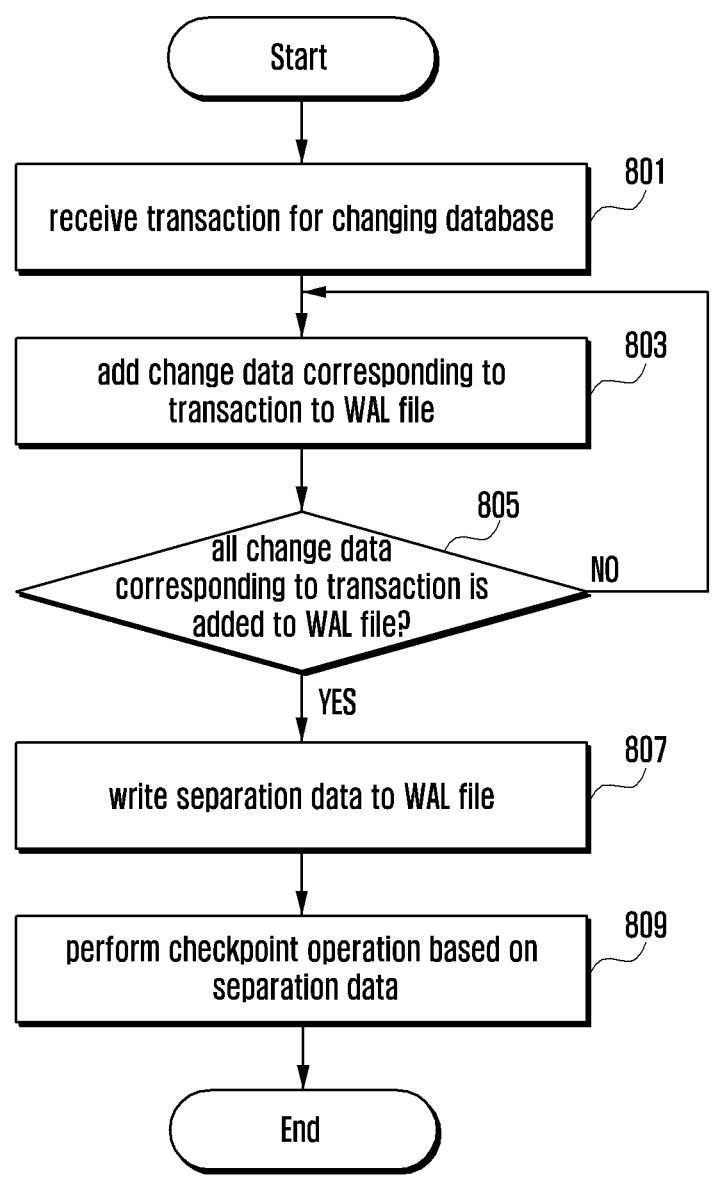
FIG. 8 is a flowchart of a data management method for an electronic device according to various embodiments of the disclosure.

FIG. 8 is a flowchart of a data management method for the electronic device 101 according to various embodiments of the disclosure. A detailed description of contents overlapping with those described in FIGS. 5 and 7 will be omitted.

With reference to FIG. 8, at operation 801, the electronic device 101 (e.g., processor 120) may receive a transaction command after the use of the database 350 is started. For example, the electronic device 101 may receive a transaction command for writing, changing, and/or deleting data in relation to the application 144 while the database 350 is open. Meanwhile, the database manager 211 and/or the WAL management module 310 of the electronic device 101 may receive a transaction command for changing data of the database 350 (e.g., insert, delete, or update) through an API from the application 144.

In various embodiments, at operation 803, the electronic device 101 may write data about processing results of the transaction to the WAL file 340. Here, the electronic device 101 may store data about processing results of the transaction in the frames 420, 430 and 440 of the WAL file 340.

Meanwhile, the electronic device 101 may change the data stored in the frames 420, 430 and 440 of the WAL file 340 to data about processing results of a transaction, for example, before operation 801, and may store data about processing results of a transaction in the frames 420, 430 and 440 in the order of the storage location in the WAL file 340.

In addition, when storing data about processing results of the transaction in the frame 420, the electronic device 101 may change the data values of Salt-1 (423) and Salt-2 (424) respectively to the data values of Salt-1 (415) and Salt-2 (416) in the header 410 of the WAL file 340.

In various embodiments, at operation 805, the electronic device 101 may determine whether all data about processing results of the transaction is stored in the WAL file 340. If all data about processing results of the transaction is not stored in the WAL file 340, the procedure returns to operation 803 at which the electronic device 101 may store data about processing results in the WAL file 340.

In various embodiments, if all data about processing results of the transaction is stored in the WAL file 340, at operation 807, the electronic device 101 may write separation data to the WAL file 340 to distinguish the frames written at operation 803 for storing data about processing results of the transaction from those frames written to the WAL file 340 before operation 801. For example, the electronic device 101 may find the last one of the frames added at operation 803 for storing data about processing results of the transaction, and may store the separation data of a preset value at at least one field of the next frame of the last added frame. For example, the electronic device 101 may store the separation data with a value of 0x00000000 at the page number field of the header of the frame immediately following the last frame in which data about processing results of the transaction is stored.

In various embodiments, at operation 809, the electronic device 101 may change the database 350 by performing a checkpoint operation based on the separation data. The electronic device 101 may determine the validity of at least one frame included in the WAL file 340 and change the database based on the frame determined to be valid. For example, the electronic device 101 may find a frame having a data value of 0x00000000 at the page number field of the frame header among the frames included in the WAL file 340, determine that at least one frame located before the found frame having a data value of 0x00000000 at the page number field of the frame header is valid, and change the database based on the page data 326 of the frame determined to be valid. Meanwhile, the checkpoint operation at operation 809 may be performed regardless of the time point where the processing of operations related to the transaction received at operation 801 is completed. For example, the checkpoint operation may be performed when the number of frames in the WAL file 340 reaches a preset number (e.g., 1000), or when a checkpoint message is generated by the application 146 associated with the database 350.

According to various embodiments of the disclosure, the validity of a specific frame included in the WAL file 340 may be determined based on the separation data. Hence, it is possible to more accurately and rapidly determine the validity of a specific frame compared with the case where the validity of a frame included in the WAL file 340 is determined based on values of Salt-1 (315) and Salt-2 (316) in the header 310 of the WAL file 340.

Figure 9:
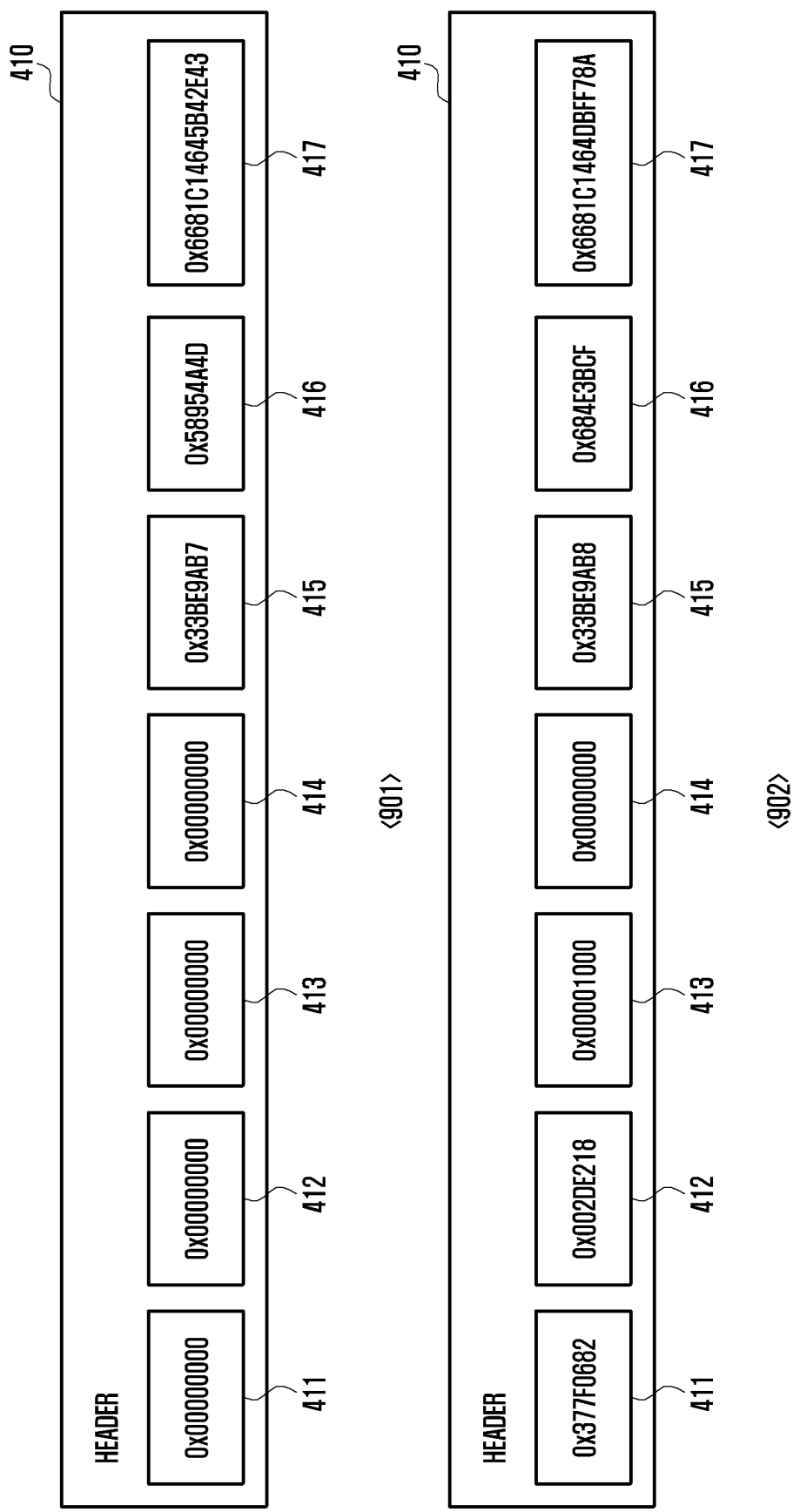
FIG. 9 shows an example of validity data of the WAL file header changed in accordance with the data management method for an electronic device according to various embodiments of the disclosure.

FIG. 9 shows an example of validity data of the header 410 of the WAL file 340 changed in accordance with the data management method for the electronic device 101 according to various embodiments of the disclosure.

Data values stored at the fields of the header 410 of an initialized WAL file 340 may be shown as indicated by indicia 901 in FIG. 9.

As indicated by indicia 902 in FIG. 9, it can be seen that data values of the magic number 311, the file format 312, and the page size 313 among the fields of the header 410 of the initialized WAL file 340 are changed respectively to the data values before initialization. On the other hand, it can be seen that the validity data value of Salt-1 (415) is increased by one among the fields of the header 410 of the initialized WAL file 340.

Figure 10A:
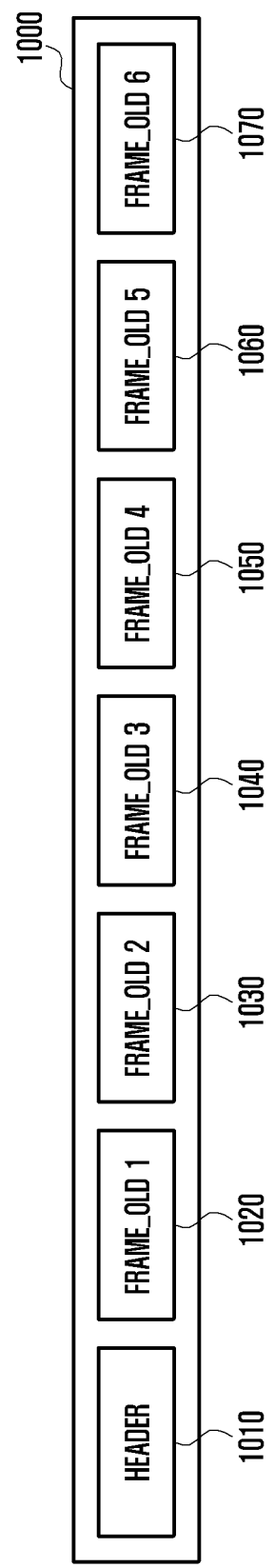
FIG. 10A illustrates a configuration of the WAL file according to various embodiments of the disclosure.
Figure 10B:
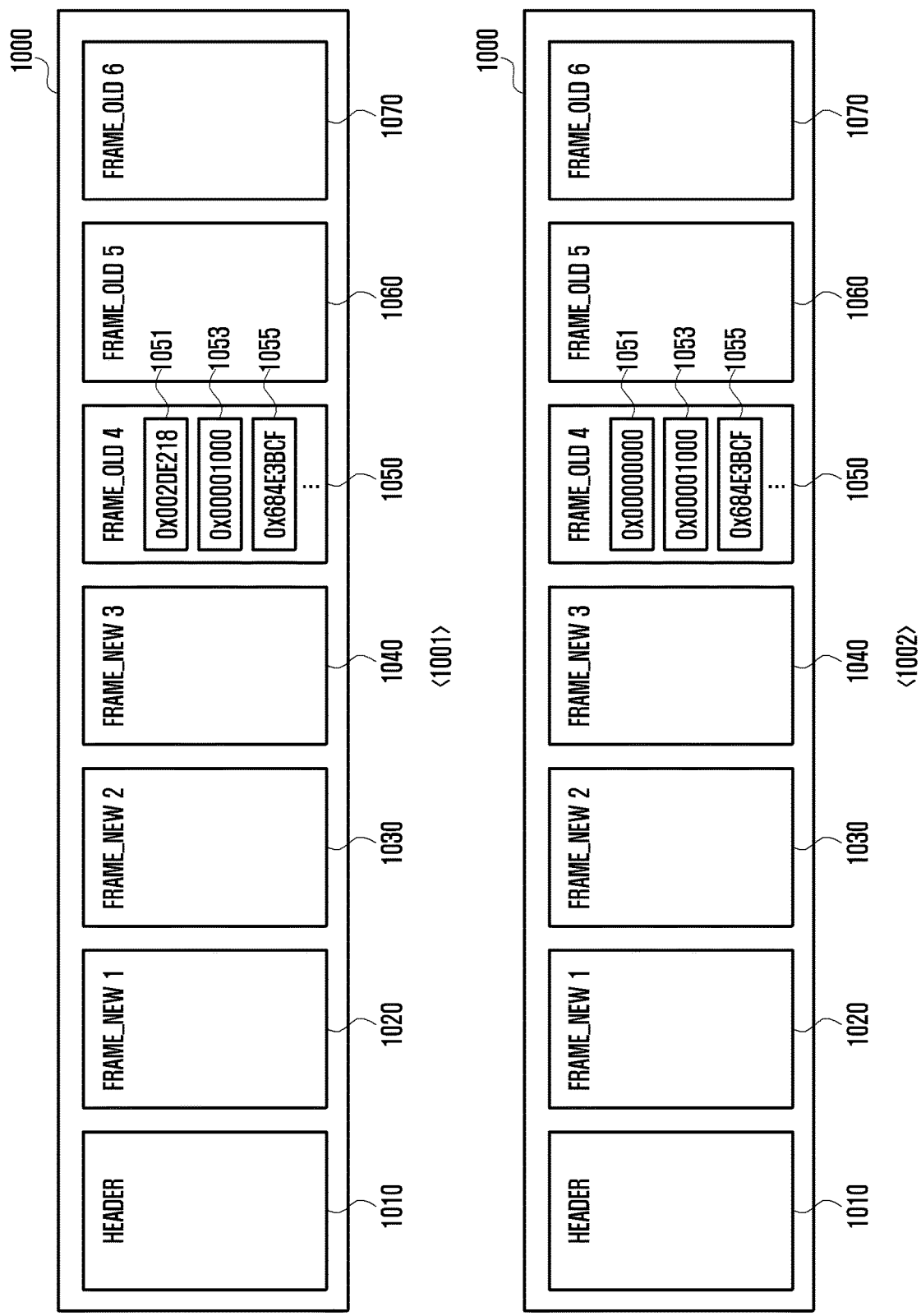
FIG. 10B illustrates frames of the WAL file changed in accordance with the data management method for an electronic device according to various embodiments of the disclosure.

FIG. 10A illustrates a configuration of the WAL file 340 according to various embodiments of the disclosure. FIG. 10B illustrates frames of the WAL file 340 changed in accordance with the data management method for the electronic device 101 according to various embodiments of the disclosure.

FIG. 10A illustrates the configuration of a WAL file 1000 (e.g., WAL file 340) before data about processing results of a transaction is stored in at least one frame of the WAL file 1000. Here, the electronic device 101 may regard the data stored in the first to sixth frames 1020 to 1070 as data written to the WAL file 1000 before initialization of the WAL file 1000.

As indicated by indicia 1001 in FIG. 10B, it can be seen that data about processing results of a transaction is stored in the first to third frames 1020 to 1040 of the WAL file 1000 (e.g., WAL file 340). It can also be seen that the next frame of the last frame (third frame 1040) in which data about processing results of the transaction is stored is the fourth frame 1050, and that different data values other than 0x00000000 are stored at the page number 1051, the commit 1053, and Salt-1 (1055) of the header of the fourth frame 1050.

As indicated by indicia 1002 in FIG. 10B, it can be seen that separation data having a value of 0x00000000 is stored at the page number 1051 of the header of the fourth frame 1050 being the next frame of the last frame (third frame 1040) in which data about processing results of the transaction is stored. In this case, the electronic device 101 may find that the frame with a data value of 0x00000000 at the page number field of the frame header is the fourth frame 1050 among the frames included in the WAL file 1000. Hence, the electronic device 101 may determine that the first to third frames 1020 to 1040 located before the fourth frame 1050 are valid, and may change the database 350 based on the first to third frames 1020 to 1040.

FIG. 11A shows an example of operations on the database and WAL file of the electronic device according to various embodiments of the disclosure.

As indicated by indicia 1101 in FIG. 11A, when the electronic device 101 receives a command to start the use of the database 350 in a state where a WAL file 340 is not present, it may generate the WAL file 340. On the other hand, when the electronic device 101 receives a command to start the use of the database 350 in a state where a WAL file 340 is present, it may restore the initialized data among the data included in the header 410 of the WAL file 340 and change the validity data included in the header 410 of the WAL file 340.

As indicated by indicia 1102, when the electronic device 101 receives a transaction command (e.g., insert, update, or delete), it may write data about processing results of the transaction to the WAL file 340. Here, the electronic device 101 may change the data of the frames stored in the WAL file 340 before the WAL file 340 is restored to the data about processing results of the transaction.

As indicated by indicia 1103, when the electronic device 101 receives a command to terminate the use of the database 350, it may initialize the WAL file 340.

Meanwhile, in the case of having received a command to terminate the use of the database 350, the electronic device 101 may delete the WAL file 340 or change the size of the WAL file 340 to zero if at least one of the following conditions is satisfied: (1) a command to delete the WAL file 340 is received from the user, (2) the size of the WAL file 340 is greater than or equal to a preset size (e.g., 4 MBytes), and (3) the WAL file retention policy is not applied. Here, the electronic device 101 may delete some of the frames included in the WAL file 340. Meanwhile, when the WAL file 340 is deleted or the size of the WAL file 340 is changed, the electronic device 101 may change the metadata 330 correspondingly.

Figure 11B:
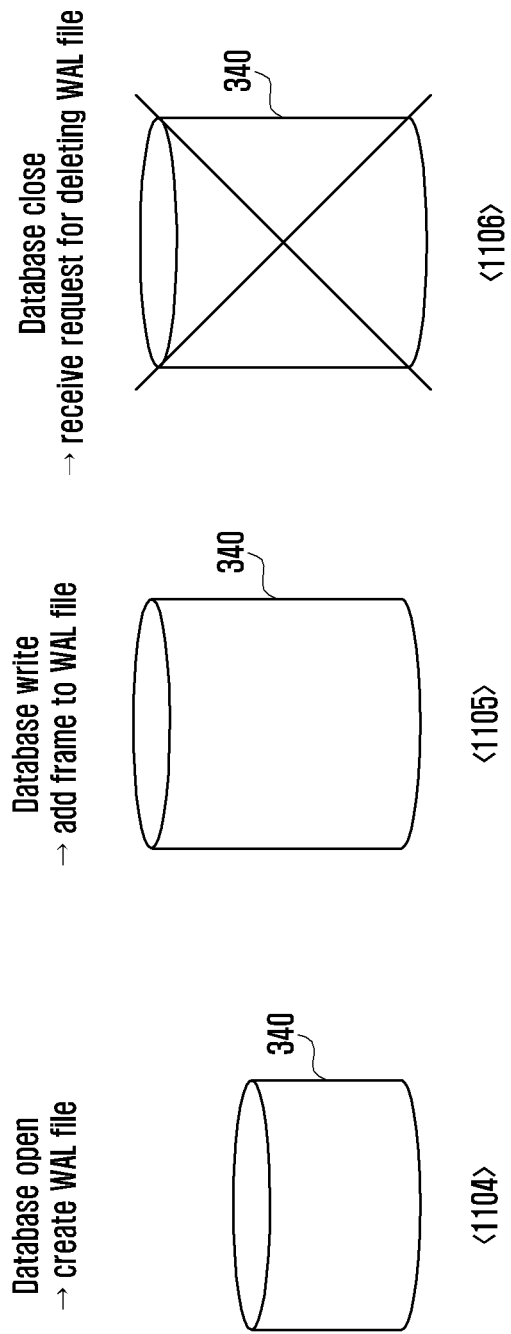
FIG. 11B shows another example of operations on the database and WAL file of an electronic device according to various embodiments of the disclosure.

FIG. 11B shows another example of operations on the database and WAL file of the electronic device according to various embodiments of the disclosure.

As indicated by indicia 1104 in FIG. 11B, when the electronic device 101 receives a command to start the use of the database 350, it may create a WAL file 340.

As indicated by indicia 1105, when the electronic device 101 receives a transaction command (e.g., insert, update, or delete), the electronic device 101 may write data about processing results of the transaction to the WAL file 340. It can be seen that, as the data about processing results of the transaction is written to the WAL file 340 indicated by indicia 1105, the size of the WAL file 340 indicated by indicia 1105 is greater than that of the WAL file 340 indicated by indicia 1104.

As indicated by indicia 1106, when the electronic device 101 receives a command to terminate the use of the database 350, the electronic device 101 may delete the WAL file 340 or change the size of the WAL file 340 to zero. Meanwhile, when the WAL file 340 is deleted or the size of the WAL file 340 is changed, the electronic device 101 may change the metadata 330 correspondingly.

It should be appreciated that various embodiments of the present disclosure and the terms used therein are not intended to limit the technological features set forth herein to particular embodiments and include various changes, equivalents, or replacements for a corresponding embodiment.

The invention claimed is:

1. An electronic device comprising:
   a memory to store a database and a write-ahead logging (WAL) file, the WAL file including a header and at least one frame including data for changing the database; and
   a processor electrically connected to the memory,
   wherein the processor is configured to:
   determine whether the at least one frame included in the WAL file is valid when use of the database is terminated;

based on determination that the at least one frame included in the WAL file is valid, change the database based on the data included in the frame determined to be valid;

based on determination that a WAL file retention policy is applied, initialize a remaining data except for reference data for determining the validity of the at least one frame among data included in the header of the WAL file;

recover the initialized data included in the header of the WAL file when the use of the database is started after the use of the database has been terminated; and change the reference data included in the header of the WAL file.

2. The electronic device of claim 1, wherein the processor is configured to initialize a unique value indicating a type of the WAL file included in the header of the WAL file.

3. The electronic device of claim 1, wherein, when processing of a transaction is required after the use of the database is started, the processor is configured to write at least one frame corresponding to the transaction to the WAL file.

4. The electronic device of claim 3, wherein, when at least one frame corresponding to the transaction is written to the WAL file, the processor is configured to:

write separation data of a preset value to the WAL file based on a storage location in the WAL file to which the at least one frame corresponding to the transaction is written; and determine the validity of the at least one frame based on the storage location in the WAL file to which the separation data is written.

5. The electronic device of claim 1, wherein the at least one frame includes validity data corresponding to the reference data included in the header, and wherein the processor is configured to:

determine the validity of the at least one frame based on whether the reference data included in the header matches the validity data included in the at least one frame.

6. The electronic device of claim 1, wherein the processor is configured to perform one of:

changing a value of the reference data to a value obtained by adding a preset value to the value of the reference data; and changing a value of the reference data to a value obtained by subtracting a preset value from the value of the reference data.

7. The electronic device of claim 1, wherein the processor is configured to:

produce a random value; and change a value of the reference data to the produced random value if the produced random value does not match the value of the reference data.

8. A method of data management for an electronic device, the method comprising:

determining whether at least one frame included in a write-ahead logging (WAL) file is valid when use of a database is terminated;

based on determination that the at least one frame included in the WAL file is valid, changing the database based on the data included in the frame determined to be valid;

based on determination that a WAL file retention policy is applied, initializing a remaining data except for reference data for determining the validity of the at least one frame among data included in a header of the WAL file;

recovering the initialized data included in the header of the WAL file when the use of the database is started after the use of the database has been terminated; and changing the reference data included in the header of the WAL file.

9. The method of claim 8, wherein initializing the remaining data included in the header comprises changing a unique value indicating a type of the WAL file included in the header of the WAL file to a preset value.

10. The method of claim 8, further comprising writing, when processing of a transaction is required after the use of the database is started, at least one frame corresponding to the transaction to the WAL file.

11. The method of claim 10, further comprising, when at least one frame corresponding to the transaction is written to the WAL file:

writing separation data of a preset value to the WAL file based on a storage location in the WAL file to which the at least one frame corresponding to the transaction is written; and determining the validity of the at least one frame based on the storage location in the WAL file to which the separation data is written.

12. The method of claim 8, wherein the at least one frame includes validity data corresponding to the reference data included in the header, further comprising:

determining the validity of the at least one frame based on whether the reference data included in the header matches the validity data included in the at least one frame.

13. The method of claim 8, wherein changing the reference data contained in the header comprises:

producing a random value; and changing a value of the reference data to the produced random value if the produced random value does not match the value of the reference data.

* * * * *